US009236652B2

(12) United States Patent
Kasemodel

(10) Patent No.: US 9,236,652 B2
(45) Date of Patent: Jan. 12, 2016

(54) BROADBAND ARRAY ANTENNA ENHANCEMENT WITH SPATIALLY ENGINEERED DIELECTRICS

(75) Inventor: Justin A. Kasemodel, McKinney, TX (US)

(73) Assignee: RAYTHEON COMPANY, Waltham, MA (US)

( * ) Notice: Subject to any disclaimer, the term of this patent is extended or adjusted under 35 U.S.C. 154(b) by 492 days.

(21) Appl. No.: 13/590,769

(22) Filed: Aug. 21, 2012

(65) Prior Publication Data

US 2014/0055316 A1 Feb. 27, 2014

(51) Int. Cl.

*H01Q 1/42* (2006.01)
*B32B 37/00* (2006.01)
*H01Q 1/24* (2006.01)
*H01Q 21/06* (2006.01)

(52) U.S. Cl.

CPC ............... *H01Q 1/246* (2013.01); *H01Q 1/421* (2013.01); *H01Q 1/422* (2013.01); *H01Q 21/06* (2013.01); *Y10T 156/10* (2015.01)

(58) Field of Classification Search

CPC .................................. H01Q 1/42; B32B 37/00
USPC ........................................................ 343/872
See application file for complete search history.

(56) References Cited

U.S. PATENT DOCUMENTS

| | | | | |
|---|---|---|---|---|
| 2,956,281 | A | 10/1960 | McMillan | |
| 3,780,374 | A | 12/1973 | Shibano et al. | |
| 4,517,571 | A * | 5/1985 | Mulliner et al. | 343/771 |
| 4,725,475 | A * | 2/1988 | Fiscus et al. | 428/156 |
| 5,117,240 | A | 5/1992 | Anderson et al. | |
| 5,497,168 | A | 3/1996 | Thomas et al. | |
| 6,081,239 | A | 6/2000 | Sabet et al. | |
| 6,567,048 | B2 | 5/2003 | McKinzie, III et al. | |
| 6,768,471 | B2 | 7/2004 | Bostwick et al. | |
| 7,071,879 | B2 | 7/2006 | Strickland | |
| 7,656,358 | B2 | 2/2010 | Haziza | |
| 7,656,359 | B2 | 2/2010 | Haziza | |
| 7,847,749 | B2 | 12/2010 | Haziza | |
| 8,054,239 | B2 | 11/2011 | Wu et al. | |
| 2004/0239577 | A1 | 12/2004 | Delgado et al. | |
| 2005/0001331 | A1 * | 1/2005 | Kojima et al. | 257/778 |
| 2006/0044189 | A1 | 3/2006 | Livingston et al. | |
| 2008/0136731 | A1 | 6/2008 | Wu et al. | |
| 2008/0238782 | A1 * | 10/2008 | Hsu et al. | 343/700 MS |
| 2010/0231433 | A1 | 9/2010 | Tishin et al. | |
| 2011/0254739 | A1 | 10/2011 | Dudley et al. | |

FOREIGN PATENT DOCUMENTS

WO 9962137 12/1999

OTHER PUBLICATIONS

HEX WEB HRP Fiberglass/Phenolic Honeycomb Product Data, Hexcel Corporation, Oct. 2006, 4 pages.

(Continued)

*Primary Examiner* — Dameon E Levi
*Assistant Examiner* — Andrea Lindgren Baltzell
(74) *Attorney, Agent, or Firm* — Cantor Colburn LLP

(57) ABSTRACT

An antenna array system includes an antenna and a radome. The radome is disposed such that electromagnetic radiation transmitted with respect to the antenna passes through the radome. The radome includes a dielectric layer, first dielectric inclusions distributed in the dielectric layer in a first pattern and second dielectric inclusions spacially and dimensionally varied from the first dielectric inclusions and distributed in the dielectric layer in a second pattern, which is different from the first pattern.

19 Claims, 4 Drawing Sheets

(56) References Cited

OTHER PUBLICATIONS

International Search Report issued on Nov. 7, 2013, in PCT/US2013/055125 filing date Aug. 15, 2013; 6 pages.

Written Opinion issued on Nov. 7, 2013, in PCT/US2013/055125 filing date Aug. 15, 2013; 5 pages.

European Search Report issued in EP 13172860 on Mar. 31, 2014, 7 pages.

* cited by examiner

BROADBAND ARRAY ANTENNA ENHANCEMENT WITH SPATIALLY ENGINEERED DIELECTRICS

BACKGROUND

The present disclosure relates generally to broadband array antennas and, more particularly, broadband array antennas enhanced with spatially engineered dielectrics.

A radome is an enclosure that protects a device, such as a microwave antenna, a radar antenna or a phased array antenna. The radome is constructed of material that minimally attenuates electromagnetic signals. Radomes also serve to protect antenna surfaces from weather or to conceal antenna electronic equipment from view. Radomes can be spherical, geodesic, planar, etc., depending upon the particular application and may be ground or aircraft based.

Phased array antennas, in particular, suffer from impedance degradation when a scanning angle is offset from a boresight angle. As such, the scanning or active reflection coefficient increases from large scan angles and tends to reduce the power transmitted to or received by the array.

SUMMARY

According to one embodiment, an antenna array system includes an antenna and a radome. The radome is disposed such that electromagnetic radiation transmitted with respect to the antenna passes through the radome. The radome includes a dielectric layer, first dielectric inclusions distributed in the dielectric layer in a first pattern and second dielectric inclusions spatially and dimensionally varied from the first dielectric inclusions and distributed in the dielectric layer in a second pattern, which is different from the first pattern.

According to another embodiment, a radome is provided and includes one or more dielectric layers, first dielectric inclusions distributed in a first pattern in the one or more dielectric layers, second dielectric inclusions distributed in a second pattern in the one or more dielectric layers and the first and second dielectric inclusions being spatially and dimensionally varied from one another.

According to another embodiment, a broadband array antenna is provided and includes a plurality of feed towers and a radome. Each feed tower includes a support structure and multiple antenna elements. The multiple antenna elements are coupled to the support structure and configured to transmit and receive electromagnetic energy. The radome is disposed about the plurality of feed towers and includes at least two or more dielectric layers. A first one of the dielectric layers has first dielectric inclusions spatially and dimensionally associated with the support structures. A second one of the dielectric layers has second dielectric inclusions spatially and dimensionally associated with the antenna elements.

According to yet another embodiment, a method of assembling a radome is provided and includes forming a first dielectric layer having first dielectric inclusions distributed in a first pattern, forming a second dielectric layer having second dielectric inclusions distributed in a second pattern, the first and second dielectric inclusions being spatially and dimensionally varied from one another and disposing at least the first and second dielectric layers in a layered structure.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Previously, the problem of a scanning or active reflection coefficient increasing from large scan angles and thereby reducing the power transmitted to or received by the array has been addressed by the use of isotropic or anisotropic wide angle impedance matching radomes or superstrates that are non-dispersive or frequency invariant. Other solutions have included the use of single or multiple uniform dielectric layers and/or printed metallic elements, such as split ring resonators or frequency selective surfaces. These options often improve scan angle performance but are generally only useful for narrowband operations. Aspects described herein, by contrast, relate to broadband array antennas and address the problems of reduced power transmission or reception associated with large scan angles by way of spatially engineered dielectrics. That is, in broadband array antennas, radomes having spatially varying materials have increased array bandwidth and scanning performance.

Figure 1:
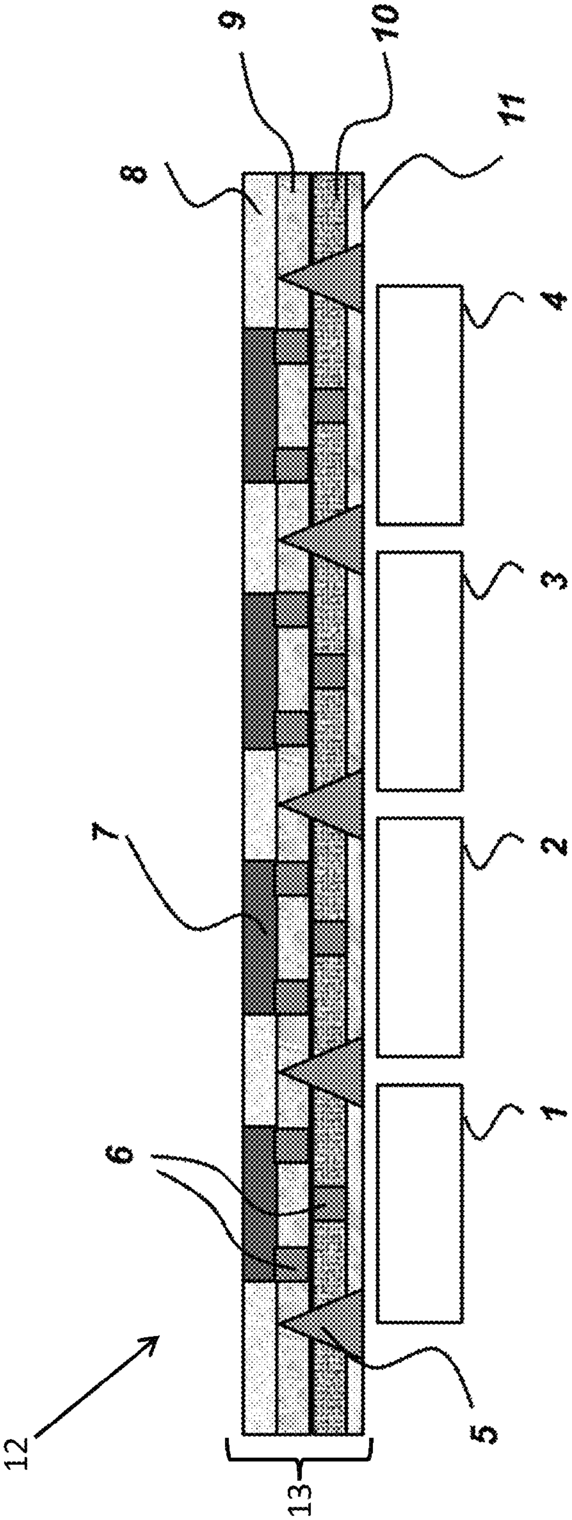
FIG. 1 is a side schematic view of an antenna array system including antenna elements and a radome in accordance with embodiments.

With reference to FIG. 1, an antenna array system 12 is provided in accordance with embodiments. As shown in FIG. 1, the system 12 includes one or more antenna elements 1-4 and a radome 13, which is formed of one or more dielectric layers 8-11 whose respective thicknesses can vary. Each of the one or more dielectric layers 8-11 may be formed of one or more dielectric materials. The radome 13 is disposed such that electromagnetic radiation transmitted with respect to the antenna elements 1-4 passes through the radome 13. The radome 13 includes first, second and third dielectric inclusions 5, 6 and 7, which are each formed of one or more dielectric materials. The first dielectric inclusions 5 may be distributed in dielectric layers 9, 10 and 11 in a first pattern, the second dielectric inclusions 6 may be distributed in dielectric layers 9 and 10 in a second pattern and the third dielectric inclusions 7 may be distributed in dielectric layer 8 in a third pattern. As shown in FIG. 1, the first, second and third patterns may be different from one another and the first, second and third dielectric inclusions 5, 6 and 7 may be spacially and dimensionally varied from one another.

Figure 2:
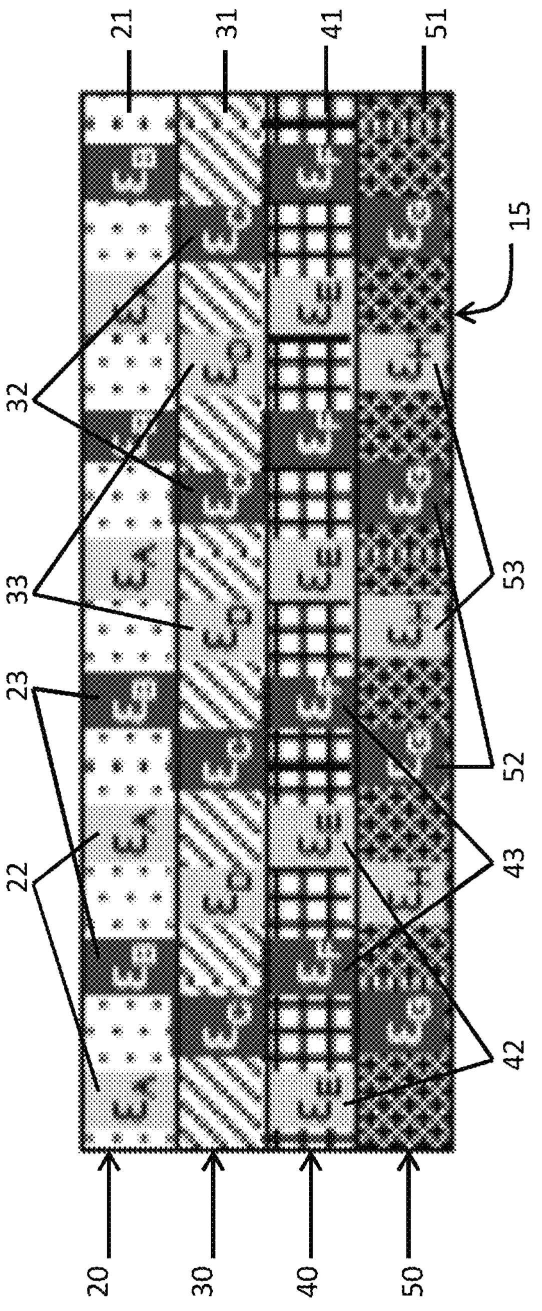
FIG. 2 is a side schematic view of a radome in accordance with further embodiments.

With reference to FIG. 2, a radome 15 is provided in accordance with further embodiments. As shown, the radome 15 includes one or more dielectric layers such as first dielectric layer 20, second dielectric layer 30, third dielectric layer 40 and fourth dielectric layer 50, although it is to be understood that the radome 15 may only include two or more dielectric layers or additional dielectric layers beyond those illustrated. In addition, although first through fourth dielectric layers 20, 30, 40 and 50 are illustrated as being substantially similar in thickness and in planar shape, this representation is merely exemplary and it is to be understood that various embodiments exist in which the various layers have different thicknesses and planar shapes.

The first dielectric layer 20 is formed of at least one or multiple dielectric materials 21 and is formed to have at least first dielectric inclusions 22 ($\in_A$) and 23 ($\in_B$) distributed in one or more first patterns. The first dielectric inclusions 22 and 23 may include one dielectric material, similar dielectric materials or multiple different dielectric materials. The second dielectric layer 30 is formed of at least one or multiple dielectric materials 31 and is formed to have at least second dielectric inclusions 32 ($\in_C$) and 33 ($\in_D$) distributed in one or more second patterns. The second dielectric inclusions 32 and 33 may include one dielectric material, similar dielectric materials or multiple different dielectric materials. The third dielectric layer 40 is formed of at least one or multiple dielectric materials 41 and is formed to have at least third dielectric inclusions 42 ($\in_E$) and 43 ($\in_F$) distributed in one or more third patterns. The third dielectric inclusions 42 and 43 may include one dielectric material, similar dielectric materials or multiple different dielectric materials. The fourth dielectric layer 50 is formed of at least one or multiple dielectric materials 51 and is formed to have at least fourth dielectric inclusions 52 ($\in_G$) and 53 ($\in_H$) distributed in one or more fourth patterns. The fourth dielectric inclusions 52 and 53 may include one dielectric material, similar dielectric materials or multiple different dielectric materials.

As used herein, the term dielectric inclusion refers to a dielectric material that is included in a corresponding dielectric layer or is at least associated with a corresponding dielectric layer. Generally, although not necessarily, the dielectric material of the dielectric inclusion will be different from that of the dielectric layer. Also, the shape of the dielectric inclusion may be variable and may be sized to fit within the corresponding dielectric layer or may be permitted to span multiple dielectric layers. That is, in the former case a thickness of the dielectric inclusion should be substantially similar to or less than the thickness of the corresponding dielectric layer whereas, in the latter case, the thickness of the dielectric inclusion could be greater than the thickness of the corresponding dielectric layer. Within a plane of the corresponding dielectric layer, the dielectric inclusion can be any shape or size.

Thus, with reference to the embodiments of FIG. 2, it is to be understood that the locations of the first dielectric inclusions 22 and 23 need not be limited to the first dielectric layer 20, that the locations of the second dielectric inclusions 32 and 33 need not be limited to the second dielectric layer 30, that the locations of the third dielectric inclusions 42 and 43 need not be limited to the third dielectric layer 40 and that the locations of the fourth dielectric inclusions 52 and 53 need not be limited to the fourth dielectric layer 50. Indeed, the various dielectric inclusions may have dimensions that exceed certain corresponding dimensions of its corresponding layer. That is, a thickness of the first dielectric inclusions 22 may exceed the thickness of the first dielectric layer 20 such that a top portion of the first dielectric inclusions 22 extend into the second dielectric layer 30.

Although the first, second third and fourth distribution patterns of the dielectric inclusions illustrated in FIG. 2 appear to be similar across the first through fourth dielectric layers 20, 30, 40 and 50, the various patterns may be substantially different from one another. Moreover, the various dielectric inclusions of each dielectric layer are spatially and dimensionally varied from one another. That is, in an exemplary comparison, the position, size and shape of first dielectric inclusions 22 are independent from the position, size and shape of second dielectric inclusions 42.

Figure 3:
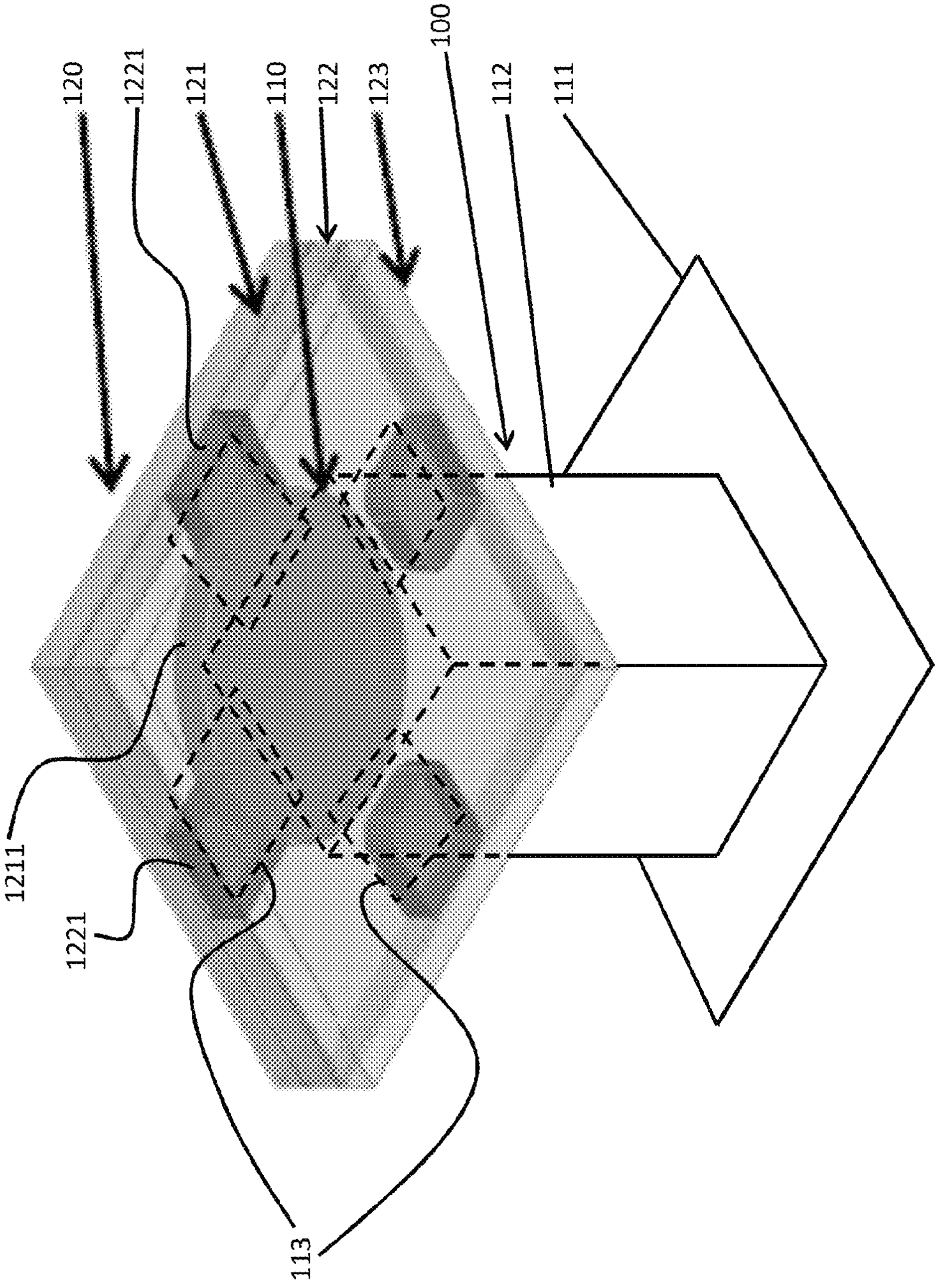
FIG. 3 is a perspective view of a portion of a broadband array antenna.

In accordance with embodiments and, with reference to FIG. 3, the dielectric inclusions of a given dielectric layer may be arranged in a pattern that is repeated throughout the two-dimensional plane of the given dielectric layer. For example, where the dielectric inclusions are substantially circular, the dielectric inclusions may be arranged in a row-column matrix throughout the corresponding dielectric layer. Meanwhile, an adjacent dielectric layer may include dielectric inclusions that are arranged around or in between the circular dielectric inclusions.

In addition, the dielectric materials of the various dielectric inclusions may be different from one another. As such, the multiple dielectric materials of the first dielectric inclusions 22 and 23 may be different from the multiple dielectric materials of the second dielectric inclusions 32 and 33. Thus, the first dielectric inclusions 22 and 23 may have different permittivities from the second dielectric inclusions 32 and 33. Moreover, due to the presence of the first and second dielectric inclusions 22 and 23, 32 and 33 in the first and second dielectric layers 20 and 30, the first dielectric layer 20 will thus have a different effective permittivity from the second dielectric layer 30.

As an example, one of the dielectric materials used in one of the dielectric inclusions may include air and one of the dielectric materials used in another one of the dielectric inclusions may include a dielectric material having a relative permittivity of about 6-20.

With reference to FIG. 3, a broadband array antenna 100 is provided (although only a single portion is illustrated) and includes a plurality of feed towers 110 and a radome 120. Each feed tower 110 includes a base 111, a support structure 112 and multiple antenna elements 113. The support structure 112 is coupled to the base 111 and may include a quad coax feed tower with four input and output lines provided therein. The multiple antenna elements 113 are each coupled to the support structure 112 and to corresponding ones of the input and output lines. The multiple antenna elements 113 are thus configured to transmit electromagnetic energy delivered thereto by the input and output lines and to receive electromagnetic energy for delivery to the input and output lines.

The radome 120 is disposed about the plurality of feed towers 110 and includes first dielectric layer 121, second dielectric layer 122 and third dielectric layer 123. The first dielectric layer 121 faces away from the base 111. The third dielectric layer 123 faces the base 111, and may be substantially uniform and may not include any inclusions. The second dielectric layer 122 is interposed between the first dielectric layer 121 and the third dielectric layer 123.

As shown in FIG. 3, the first dielectric layer 121 has first dielectric inclusions 1211 that are each spatially and dimensionally associated with the support structure 112 of the corresponding feed tower 110. That is, the first dielectric inclusions 1211 may be substantially circular and disposed in alignment with a long axis of the support structure 112. The second dielectric layer 122 has second dielectric inclusions 1221 that are each spatially and dimensionally associated with each of the antenna elements 113 of the corresponding feed tower 110. That is, the second dielectric inclusions 1211 may be substantially polygonal and disposed in alignment with positions of the antenna elements 113. As the antenna elements 113 are arranged at each side of the four-sided support structure 112, these positions may be defined between adjacent pairs of the first dielectric inclusions 1211 or at 12:00, 3:00, 6:00 and 9:00 positions around each of the first dielectric inclusions 1211.

In the embodiment of FIG. 3, it will be understood that the regions of the first, second and third dielectric layers 121, 122 and 123 aligned with the support structures 112 may be relatively high frequency radiation regions whereas the regions aligned with the antenna elements 113 may be relatively low frequency radiation regions. Such low frequency radiation regions should be loaded with high permittivity materials, such as materials with relative permittivities of about 6-20, while such low frequency radiation materials should be loaded with low permittivity materials, such as air. Thus, the substantially circular first dielectric inclusions 1211 and the polygonal second dielectric inclusions 1222 may be filled with high permittivity materials.

Figure 4:
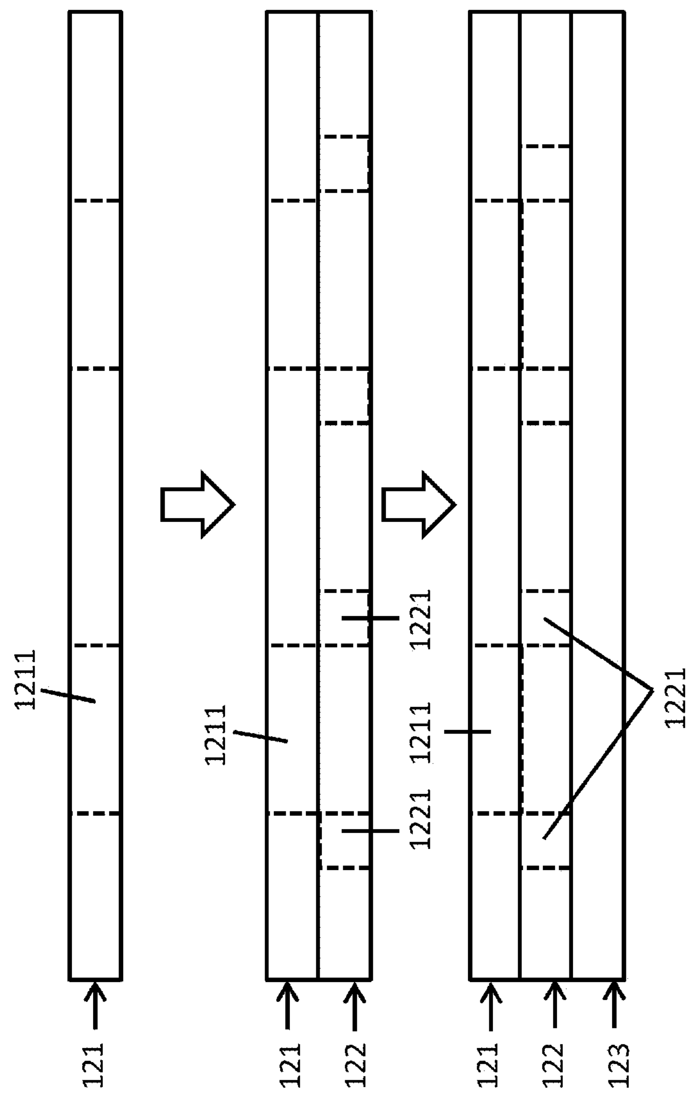
FIG. 4 is a flow diagram illustrating a method of assembling a radome.

A method of assembling the radome 120 of FIG. 3 will now be described with reference to FIG. 4 although it is to be understood that the method could be applied to the embodiments of FIGS. 1 and 2 as well. As shown in FIG. 4, the first dielectric layer 121 is initially formed with the first dielectric inclusions 1211 provided as through-holes extending from one face of the first dielectric layer to the opposite face. Next, the second dielectric layer 122 is formed with the second dielectric inclusions 1221, which may be filled with a dielectric material having a relative permittivity of about 6-20. At this point, the first dielectric layer 121, the second dielectric layer 122 and the first dielectric layer 123 are laminated and/or adhered to one another to form the radome 120 with the relative positioning of the first and second dielectric layers 121 and 122 defining the relative positioning of the first dielectric inclusions 1211 and the second dielectric inclusions 1221.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagram depicted herein is just one example. There may be many variations to this diagram or the steps (or operations) described therein without departing from the spirit of the disclosure. For instance, the steps may be performed in a differing order or steps may be added, deleted or modified. All of these variations are considered a part of the claimed embodiments.

What is claimed is:

1. An antenna array system including an antenna and a radome disposed such that electromagnetic radiation transmitted with respect to the antenna passes through the radome, the radome comprising:

multiple dielectric layers of varying thicknesses; and at least first and second dielectric inclusions, the first dielectric inclusions being distributed in a first pattern and each of the first dielectric inclusions spanning two or more of the multiple dielectric layers, and the second dielectric inclusions being spacially and dimensionally varied from the first dielectric inclusions and distributed in a second pattern, which is different from the first pattern, each of the second dielectric inclusions spanning one of the two or more of the multiple dielectric layers spanned by each of the first dielectric inclusions to be at least partially coplanar with the first dielectric inclusions.

2. The antenna array system according to claim 1, wherein the dielectric layer, the first dielectric inclusions and the second dielectric inclusions are formed of varied dielectric materials.

3. A radome, comprising:

one or more dielectric layers; and at least first and second dielectric inclusions, the first dielectric inclusions being circular and distributed in a first pattern in the one or more dielectric layers, which is repeated in a two dimensional plane of a first one of the one or more dielectric layers, the second dielectric inclusions being polygonal and distributed circumferentially about the first dielectric inclusions in a second pattern in the one or more dielectric layers, which is repeated in a two dimensional plane of a second one of the one or more dielectric layers, and the first and second dielectric inclusions being spatially and dimensionally varied from one another with each of the second dielectric inclusions spanning a dielectric layer spanned by the first dielectric inclusions to be at least partially coplanar with the first dielectric inclusions.

4. The radome according to claim 3, wherein the one or more dielectric layers comprises multiple dielectric layers, each dielectric layer comprises multiple dielectric materials.

5. The radome according to claim 3, wherein the first dielectric inclusions comprise a first dielectric material and the second dielectric inclusions comprise a second dielectric material.

6. The radome according to claim 5, wherein the first dielectric material has a different permittivity from the second dielectric material.

7. The radome according to claim 3, wherein the first dielectric inclusions comprise multiple first dielectric materials and the second dielectric inclusions comprise multiple second dielectric materials.

8. The radome according to claim 7, wherein each of the multiple first dielectric materials have different permittivities from each of the multiple second dielectric materials.

9. The radome according to claim 8, wherein one of the first and second dielectric materials comprises air and the other comprises a dielectric material having a permittivity of about 6-20.

10. A broadband array antenna, comprising:

feed tower including a support structure extending along longitudinal axis and multiple antenna elements coupled to the support structure to extend radially outwardly from the support structure relative to the longitudinal axis, the multiple antenna elements being configured to transmit and receive electromagnetic energy; and a radome disposed at a longitudinal end of the feed towers and comprising:

at least two or more dielectric layers, a first one of the dielectric layers having first circular dielectric inclusions aligned with the longitudinal axis to be spatially and dimensionally associated with the support structures; and a second one of the dielectric layers having second polygonal dielectric inclusions distributed circumferentially about the first circular dielectric inclusions to be spatially and dimensionally associated with the antenna elements.

11. The radome according to claim 10, wherein each dielectric layer comprises multiple dielectric materials.

12. The radome according to claim 10, wherein the first dielectric inclusions comprise a first dielectric material and the second dielectric inclusions comprise a second dielectric material.

13. The radome according to claim 12, wherein the first dielectric material has a different permittivity from the second dielectric material.

14. The radome according to claim 10, wherein the first dielectric inclusions comprise multiple first dielectric materials and the second dielectric inclusions comprise multiple second dielectric materials.

15. The radome according to claim 14, wherein each of the multiple first dielectric materials have different permittivities from each of the multiple second dielectric materials.

16. The radome according to claim 15, wherein one of the first and second dielectric materials comprises air and the other comprises a dielectric material having a permittivity of about 6-20.

17. A method of assembling a radome, comprising:

forming a first dielectric layer having at least first circular dielectric inclusions distributed in a first pattern, which is repeated in a two dimensional plane of the first dielectric layer;

forming a second dielectric layer having at least second polygonal dielectric inclusions distributed circumferentially about the first circular dielectric inclusions in a second pattern, which is repeated in a two dimensional plane of the second dielectric layer;

the first and second dielectric inclusions being spatially and dimensionally varied from one another; and disposing at least the first and second dielectric layers in a layered structure each of the second dielectric inclusions spanning the first dielectric layer to be at least partially coplanar with the first dielectric inclusions.

18. The method according to claim 17, wherein the forming of the first and second dielectric layers comprises forming each of the first and second dielectric layers with multiple dielectric materials; and wherein the first dielectric inclusions comprise multiple first dielectric materials and the second dielectric inclusions comprise multiple second dielectric materials.

19. The method according to claim 18, wherein each of the multiple first dielectric materials have different permittivities from each of the multiple second dielectric materials.

* * * * *